(12) United States Patent
Simske et al.

(10) Patent No.: US 8,915,433 B2
(45) Date of Patent: Dec. 23, 2014

(54) INDENTIFIER ELIGIBILITY (71) Applicant: Hewlett-Packard Development Company, L.P., Houston, TX (US)

(72) Inventors: Steven J Simske, Ft. Collins, CO (US);
Marie Vans, Ft. Collins, CO (US);
Cesare Gritti, Boulder, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/785,584

(22) Filed: Mar. 5, 2013

(65) Prior Publication Data
US 2014/0252092 A1 Sep. 11, 2014

(51) Int. Cl.
*G06K 5/00* (2006.01)
*G06K 7/14* (2006.01)

(52) U.S. Cl.
CPC ............ *G06K 7/1434* (2013.01); *G06K 7/1473* (2013.01); *G06K 5/00* (2013.01)
USPC ........................................................ 235/437

(58) Field of Classification Search
USPC ................. 235/454, 385, 494, 462.01, 462.1, 235/462.07; 707/E17.113; 382/100
See application file for complete search history.

(56) References Cited

U.S. PATENT DOCUMENTS

| | | | |
|---|---|---|---|
| 4,490,811 A | 12/1984 | Yianilos | |
| 6,442,276 B1 | 8/2002 | Doljack | |
| 6,947,941 B1 | 9/2005 | Koon | |
| 7,325,737 B2 * | 2/2008 | Epshteyn et al. | 235/462.08 |
| 2009/0138302 A1 | 5/2009 | Breznik et al. | |
| 2011/0073650 A1 * | 3/2011 | Chiou et al. | 235/462.07 |
| 2011/0112917 A1 | 5/2011 | Driessen | |
| 2011/0160576 A1 * | 6/2011 | Bower et al. | 600/425 |

OTHER PUBLICATIONS

"How Serialization Can Reduce Pharma Counterfeiting", Aug. 12, 2009.

* cited by examiner

*Primary Examiner* — Christle I Marshall (57) ABSTRACT

In various disclosed examples, an identifier is selected from a first set of identifiers, the selected identifier having a representation of at least two different characters. An indication of a difference between the representation of the selected identifier and representations of one or more identifiers from a second set of identifiers is calculated, and the selected identifier is determined to be an eligible identifier if the indication of the difference satisfies a threshold criteria.

9 Claims, 6 Drawing Sheets

INDENTIFIER ELIGIBILITY

BACKGROUND

Serialization is used to uniquely identify each of a large set of items. For example, bar codes may be used to identify retail items. Similarly, serial numbers on various products are used to identify each individual product in the set distinct from all other products in the set. Such identifiers may be applied to packaging material or may be applied to objects using labels or medallions, or even impressed or stamped on the object.

BRIEF DESCRIPTION OF THE DRAWINGS

For a more complete understanding of various examples, reference is now made to the following descriptions taken in connection with the accompanying drawings in which.

DETAILED DESCRIPTION

In various examples, a serialization identifier for an object may be selected to avoid inadvertent detection of the object as a point-of-sale identifier. Various objects may have different types of identifiers intended for different uses, for example. Such identifiers may be used for point of sale (POS) transactions or for other, non-POS purposes. The non-POS identifiers may be detected by a POS identifier, resulting in the detection of an incorrect item. Various examples described herein provide a differentiation between two or more sets of identifiers to avoid such problems. For example, the set of non-POS identifiers may be selected such that, even with error correction for the POS identifiers, the non-POS identifiers are not read as any POS identifiers. In this regard, a sufficiently large Hamming distance is used to create a gap between the two sets of identifiers.

In various examples, the non-POS identifier may be associated with the object as any of a variety of identifiers, such as a serial number. In order to avoid being misread as a point-of-sale identifier, such as a barcode used for checkout for example, a Hamming distance may be provided between a representation (e.g., a binary representation) of the selected identifier and representations of a set of point-of-sale identifiers. In various examples, the Hamming distance is greater than a Hamming distance that may be associated with an error correction for the point-of-sale identifiers.

In various examples described herein, identifiers may be generated and/or used for mass serialization. Such identifiers may be used for various purposes, such as serial numbers for unique identification of a product. Such identifiers may be presented in various forms, such as 2-D barcodes (e.g., Data Matrix or Quick Response (QR) codes). Other identifiers, such as Universal Product Code (UPC) barcodes, are commonly used as a point-of-sale identifier for an object.

Figure 1:
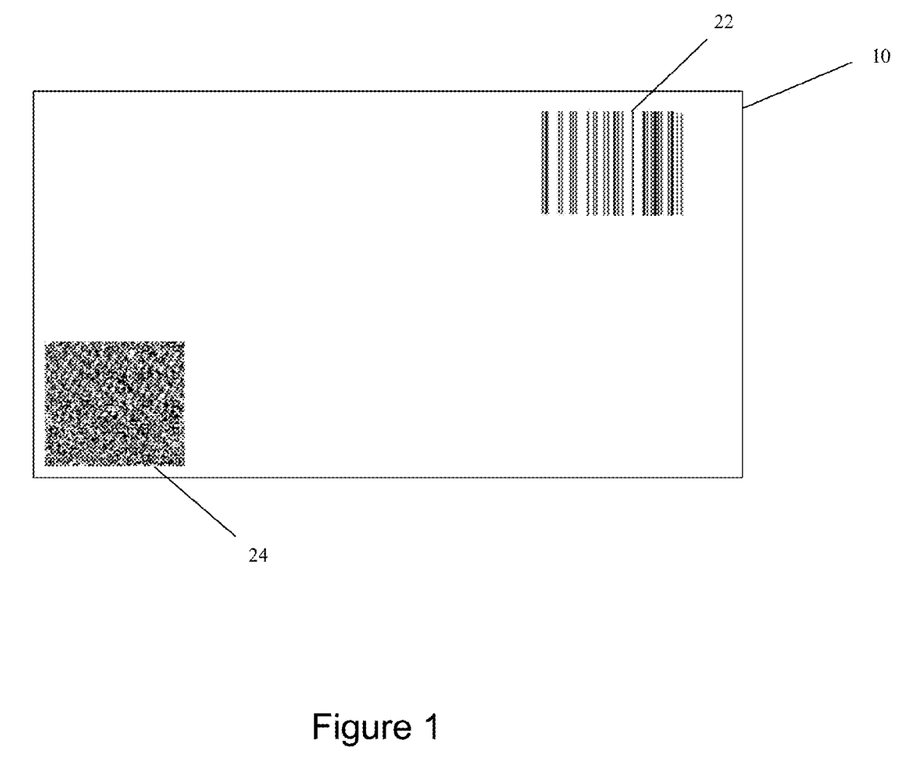
FIG. 1 illustrates an example object with serialization identifiers.

Referring now to FIG. 1, an example object 10 is illustrated with example identifiers 22, 24. The object 10 may be any of a variety of objects, such as an object for retail sale, a component for a larger assembly, etc.

In some examples, the object may include a first identifier 22 intended for use as a point-of-sale (POS) identifier. In this regard, the first identifier 22 may be a UPC barcode, as illustrated in the example of FIG. 1. The first identifier 22 may be intended to be read by a machine, such as a scanner, at a POS for determination of, for example, the sale price of the object.

In the illustrated example, the object 10 is also provided with a second identifier 24 which is a non-POS identifier. The second identifier 24 may be any of a variety of identifiers, such as a bar code, a 2-D bar code such as a quick-response (QR) code or the like. The second identifier 24 may be used to identify various features of the product 10. For example, the second identifier 24 may be used to identify the type of product (e.g., brand, type and size of a box of cereal) or to uniquely identify each item in a set of items such as, for example, a serial number for each component in a set of identical components.

Each of the identifiers 22, 24 may encode a representation of the identifier. In the illustrated example of FIG. 1, the identifiers 22, 24 encode a binary representation including a series of 0's and 1's. As described in greater detail below, in various examples, a Hamming distance between the representations of the identifiers is sufficiently large to either eliminate or reduce the likelihood that one identifier (e.g., the non-POS identifier 24) will be mistakenly read by a machine a different type of identifier (e.g., the POS identifier 22). In the illustrated example of FIG. 1, the Hamming distance of 8 is provided, as described in greater detail below with reference to FIG. 3(b).

While the illustrated example of FIG. 1 provides an object 10 with two identifiers, some objects may only include non-POS identifiers. In this regard, such objects may not be intended for retail sale, for example.

Figure 2:
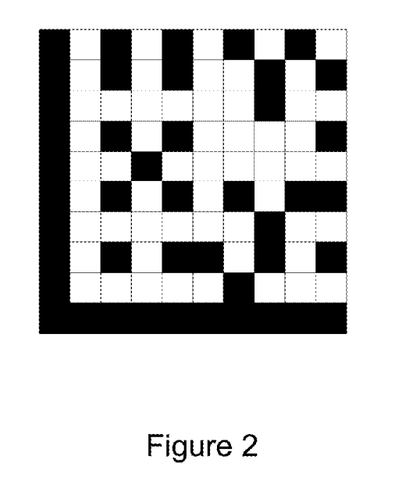
FIG. 2 illustrates an example identifier.

Referring now to FIG. 2, example identifiers are illustrated that may be used as serialization identifiers. The example identifier of FIG. 2(a) is a two-dimensional, machine-readable bar code having a plurality of regions (e.g., squares) that may be white or black. In other examples, additional colors may be used also. A blank template of the example identifier may include black squares along two adjacent sides (left and bottom in FIG. 2(a)) and alternating black and white squares along the two other adjacent sides (right and top in FIG. 2(a)). This configuration may allow for orientation of the identifier by a machine reading the identifier, such as a scanner. The rest of the identifier may be used to encode a representation, such as a binary representation of the identifier. In this regard, the identifier includes a combination of black and white regions (or squares), each of which may represent one bit in the binary string, black translating to 0 and white translating to 1. In other embodiments, other colors may be used to encode multiple bits in each square.

FIG. 2(b) illustrates an example identifier that may be used, for example, as a POS identifier. In the illustrated example of FIG. 2(b), the POS identifier is a bar code including a series of lines, similar to UPC barcodes. As described above with reference to FIG. 1, each of the identifiers illustrated in FIGS. 2(a) and 2(b) may encode a representation of the identifier, such as a binary representation. As with the illustrated example of FIG. 1, the example identifiers of FIG. 2 have a Hamming distance of 8.

Thus, the identifiers may have a representation as a string of characters. For example, the identifiers of FIG. 2 may be represented as a binary string of 0's and 1's. In other examples, the string of characters may include various other types of characters, such as lower case letters, upper case letters, numerals, and/or various other types of characters.

POS identifiers may be similarly coded and represented as strings of characters, such as binary strings of 0's and 1's. Further, certain machine-readable POS identifiers (or the POS machine readers) may incorporate an error correcting code (ECC). The ECC may be used to identify a POS identifier if, for example, a portion of the identifier is missing or otherwise unreadable.

Figure 3:
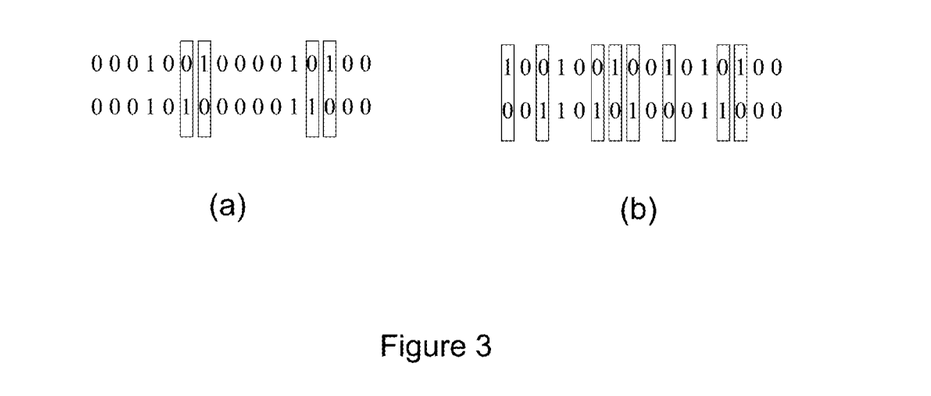
FIG. 3 illustrates examples of a Hamming distance between binary representations of two identifiers.

FIG. 3 illustrates an example of the operation and/or effects of an ECC. In each of the illustrated examples of FIGS. 3(a) and 3(b), the binary string on the top represents a POS identifier associated with a particular object. The binary string on the bottom represents an identifier as read by a POS machine reader, such as a scanner. The difference between the strings may be due to either a missing portion of the appropriate identifier or the reading of an incorrect identifier. For example, in the first instance, the scanner may read an identifier and interpret it as the representation on the bottom. Due to a missing or otherwise unreadable portion, the scanner interprets the identifier as being represented by the binary string on the bottom. In the second instance, the scanner may have read an identifier corresponding to either a different POS identifier or a non-POS identifier.

A scanner may use the ECC to accommodate certain differences between the representation of the identifier that is received and a POS identifier. Various examples described herein may prevent the scanner from interpreting a non-POS identifier as a POS identifier with a missing or unreadable portion.

Referring again to FIG. 3, differences in the representations of the identifiers may be indicated in various manners. In various examples, a Hamming distance may be used as an indication of the difference between two strings. The Hamming distance may be determined as the number of characters in two strings that are different. Thus, as illustrated in FIG. 3(a), the Hamming distance between the two strings is four, indicated by the four highlighted positions with different values. Similarly, in the example of FIG. 3(b), the Hamming distance is eight.

The ECC may be effective up to a certain threshold of differences between the two strings. For example, the differences in the strings illustrated in FIG. 3(a) may be within the ECC threshold and may, therefore, be accommodated to identify the bottom string as being indicative of an identifier represented by the top string. On the other hand, the differences in the strings illustrated in FIG. 3(b) may be beyond the threshold, resulting in a failed identification of the top string based on reading of the bottom string.

Various examples described herein allow for the selection of an identifier from a first set of identifiers, such as a non-POS mass serialization set, that may be used without being mistaken for an identifier from a second set of identifiers (e.g., a set of POS identifiers). In this regard, a set of candidate identifiers may be created for the first set (e.g., non-POS) of identifiers.

A set of identifiers for mass serialization may require a large number of unique identifiers. For example, a serial number may be assigned to each unit of a product for which a large number of units may be produced. Thus, each unit would be assigned a unique identifier.

A discussion of certain concepts is useful in understanding the various examples described herein. In particular, the concepts described below illustrate the determination of a set of identifiers from which certain identifiers may be selected as eligible for use as, for example, a set of non-POS identifiers.

For example, as described below, a set of binary representations having a length of 40 characters may be selected, within which a subset may include strings having a certain number of 1's. Further, in various examples, the eligible identifiers may be those satisfying a threshold (e.g., a Hamming distance) relative to another set of identifiers (e.g., a set of POS identifiers).

First, it is noted that the number of combinations ($C_{n,p}$) for selecting p items out of n items, where p and n are both non-negative integers and where p≤n, is defined as:

$$C_{n,p} = \binom{n}{p} = \frac{n!}{p!(n-p)!}$$

where n! is the factorial operator: $n! = n*(n-1)*(n-2)* \ldots *1$. By definition, $0! = 1$.

Serialization may provide a unique identifier to each of a plurality of items. For serialization, the number of serialization combinations is dictated by the base, b, of the character to be printed, raised to the power of N, the number of digits to be printed. For example, if the 26 uppercase and 26 lowercase English characters, along with the 10 numerals are used, then the base is 62, and the number of possible mass serialized values is $62^N$. In other examples, for a binary string, the base is 2. In general, the number of mass serialized values, $n_{MS}$, is given by:

$$n_{MS} = b^N$$

If the base of the serialization is a power of 2; that is, $b = 2^P$, then the number of mass serialized value is:

$$n_{MS} = 2^{PN}$$

Thus, the mass serialization may represent PN bits. If b is not a power of two, then:

$$n_{MS} = 2^{N \log_2 b}$$

Thus, in various examples, the serialization provides $N \log_2 b$ bits of data. For mapping to this serialization, then, the fractional portion of $N \log_2 b$ may be ignored, and the integer portion may represent the number of bits encoded into the N digits using the b-wide character set.

In various example, the number of bits of data may represent the length of a binary representation of the serialization and may be set to a predetermined length (B). Further, in various examples, the number of 1's in the binary representation may be set within a predefined range. In one example, the length of the binary representation may be set at 40, and the number of 1's in the binary represenation may be set between 18 and 22. Thus, a sufficiently large number of candidate identifiers for use as, for example, non-POS identifiers may be provided. The set of identifiers, including all candidate identifiers, may be stored in a database.

Figure 4:
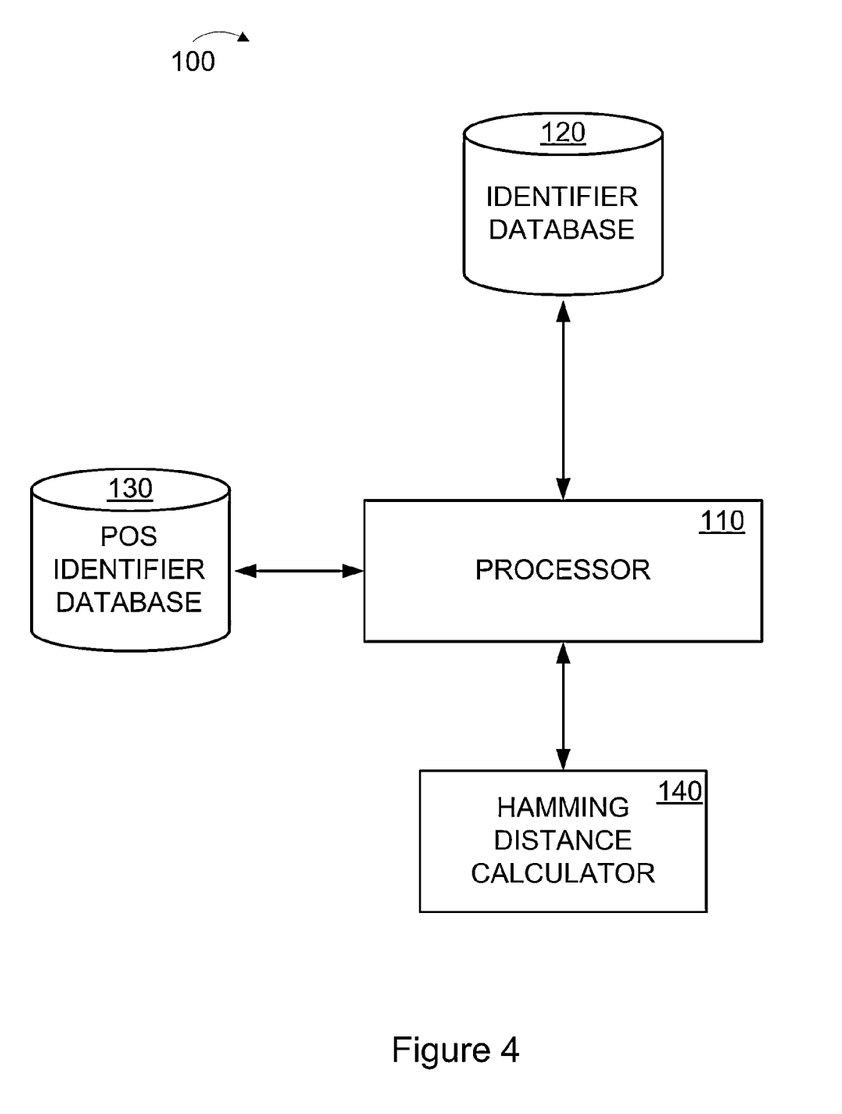
FIG. 4 illustrates an example system for selection of identifiers.

Referring now to FIG. 4, an example system is schematically illustrated. The example system 100 of FIG. 4 may be used to determine identifiers from the mass serialization set of candidate identifiers that may be eligible, for example, for inclusion in a subset designed to avoid being misread as an identifier from a second set (e.g., a set of POS identifiers). The example system 100 includes a processor 110 that can perform various functions and may be interfaced with various other components.

The processor 110 may be coupled to an identifier database 120 which may include the mass serialization set including all candidate identifiers described above. The processor may also be coupled to a second database (e.g., a POS identifier database) 130 which includes a second set of identifiers (e.g., a set of POS identifiers).

In various examples, the processor 110 is coupled to a Hamming distance calculator 140. The Hamming distance calculator 140 may determine the difference between representations of two identifiers. In some examples, the difference between the representations is indicated by the Hamming distance. In other examples, the difference may be indicated by various other indications of differences.

Figure 5:
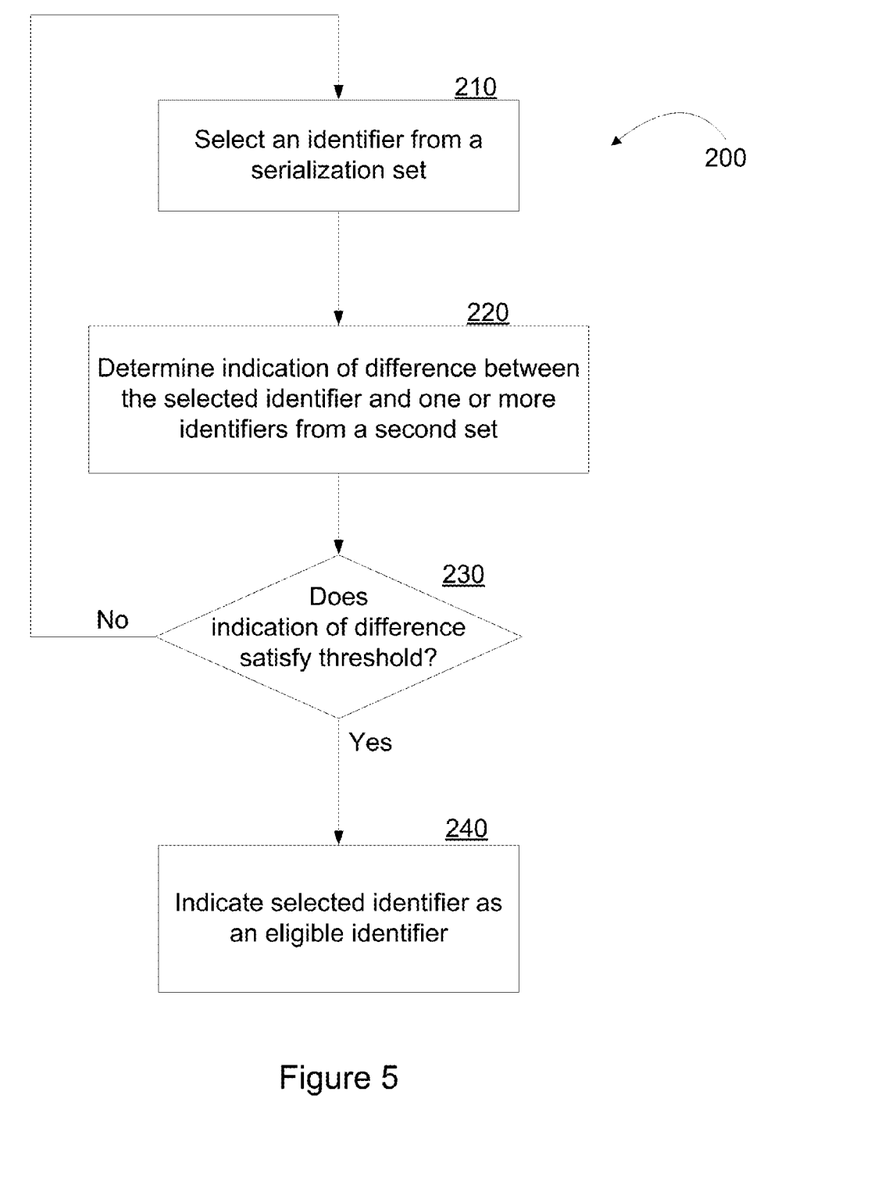
FIG. 5 is a flow chart illustrating an example process for selection of an identifier.

Referring now to FIG. 5, a flow chart illustrates an example method 200. The example method 200 may be executed in or by, for example, the processor 110 in the example system illustrated in FIG. 4. In the example method 200, an identifier from the serialization set is selected (block 210). As described above, in various examples, the serialization set may include all candidate identifiers for the first set of identifiers and may be stored in the identifier database 120 illustrated in the example of FIG. 4.

In the illustrated example of FIG. 5, an indication of a difference may be determined between the selected identifier from the first set and one or more identifiers from the second set (block 220). In this regard, the second set may be the set of POS identifiers that may be stored in the POS identifier database 130 illustrated in the example of FIG. 4. In various examples, the indication of difference may be the Hamming distance between the representations (e.g., binary representations) of the identifiers. In various examples, the processor may call the Hamming distance calculator 140 of FIG. 4 to determine the indication of the difference.

In various examples, the processor 110 may determine whether the indication of the difference determined at block 220 satisfies a threshold (block 230). In this regard, the threshold may be associated with the error correction associated with the second set of identifiers, for example. For example, the error correction capability associated with the POS identifiers may be the equivalent of a Hamming distance of less than a particular value T. The threshold may thus be set at that particular value T. The threshold may be satisfied if the Hamming distance is greater than (or equal to) T. In various examples, the threshold may be required to be satisfied by a predetermined portion of the identifiers in the second set of identifiers. For example, if the selected identifier from the first set (e.g., non-POS identifier) has a Hamming distance greater than the threshold for at least 90 percent of the identifiers in the second set (e.g., POS identifiers), the threshold may be considered satisfied.

If the threshold is not satisfied, the selected identifier may be determined to be ineligible for use, and the process may return to block 210 and select a different identifier from the first set. The process of steps 210-230 may then be repeated.

If the threshold is satisfied, the selected identifier may be determined to be eligible for use (block 240). The determination of an identifier as eligible or ineligible may be recorded by updating the identifier database 120 illustrated in the example of FIG. 4, for example. The eligible identifiers may thus be associated with objects in a mass serialization with reduced or eliminated risk of being mistakenly read as an identifier from the second set (e.g., POS identifiers).

Figure 6:
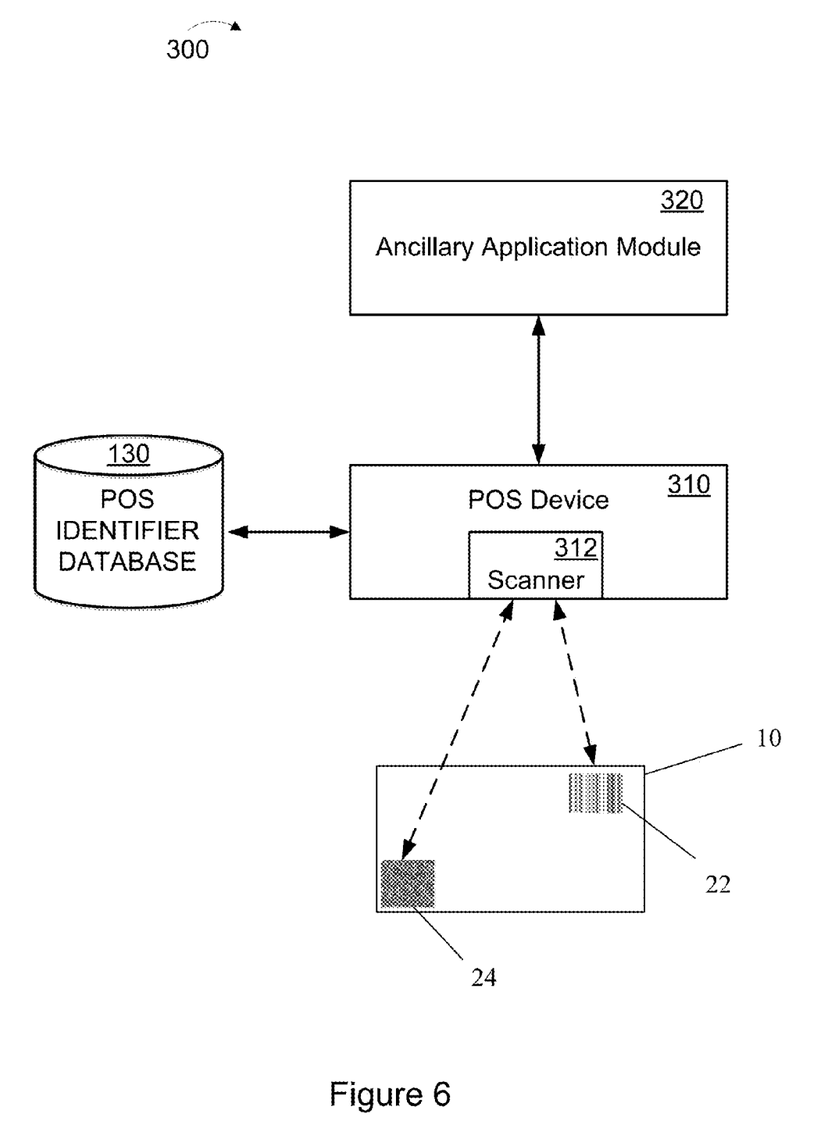
FIG. 6 illustrates an example system for reading an identifier.

Referring now to FIG. 6, an example system for reading an identifier at, for example, a POS device is illustrated. In accordance with the illustrated example, an object, such as the object 10 of FIG. 1, containing one or more identifiers 22, 24 may be scanned by a POS device 310. The POS device 310 may be, for example, a register at a check-out station. In other example, the device may be a scanner for purposes other than point-of-sale transactions.

The example POS device 310 may be provided with a scanner 312, such as a laser scanner, or another form of detector. For example, in other examples, the scanner 312 may be replaced with an RFID receiver. In the illustrated example, the scanner 312 may be able to read one or more identifiers (e.g., identifiers 22, 24) on the object 10.

The example POS device 310 may be provided with various other components not illustrated in FIG. 6. For example, the POS device 310 may also include a processor and a communication interface for communication (e.g., wired, wireless, etc.) with various other devices.

The example POS device 310 may be communicatively coupled with a database of identifiers 130. In the illustrated example of FIG. 6, the POS device 310 is coupled to a database of POS identifiers 130 illustrated in FIG. 2. The example POS device 310 may include processing code for processing identifiers that may be associated with an identifier in the POS identifier database 130, for example. In this regard, the code for processing may include facilitating a sale transaction for a product (e.g., the object 10) associated with a scanned identifier (e.g., identifier 22).

The example POS device 310 may also be coupled to an ancillary application module 320. In various examples, the ancillary application module 320 may include one or more applications which may be capable of processing, for example, an identifier read by the POS device 310 that is not associated with an identifier in the POS identifier database 130, as described below with reference to the example process of FIG. 7.

Figure 7:
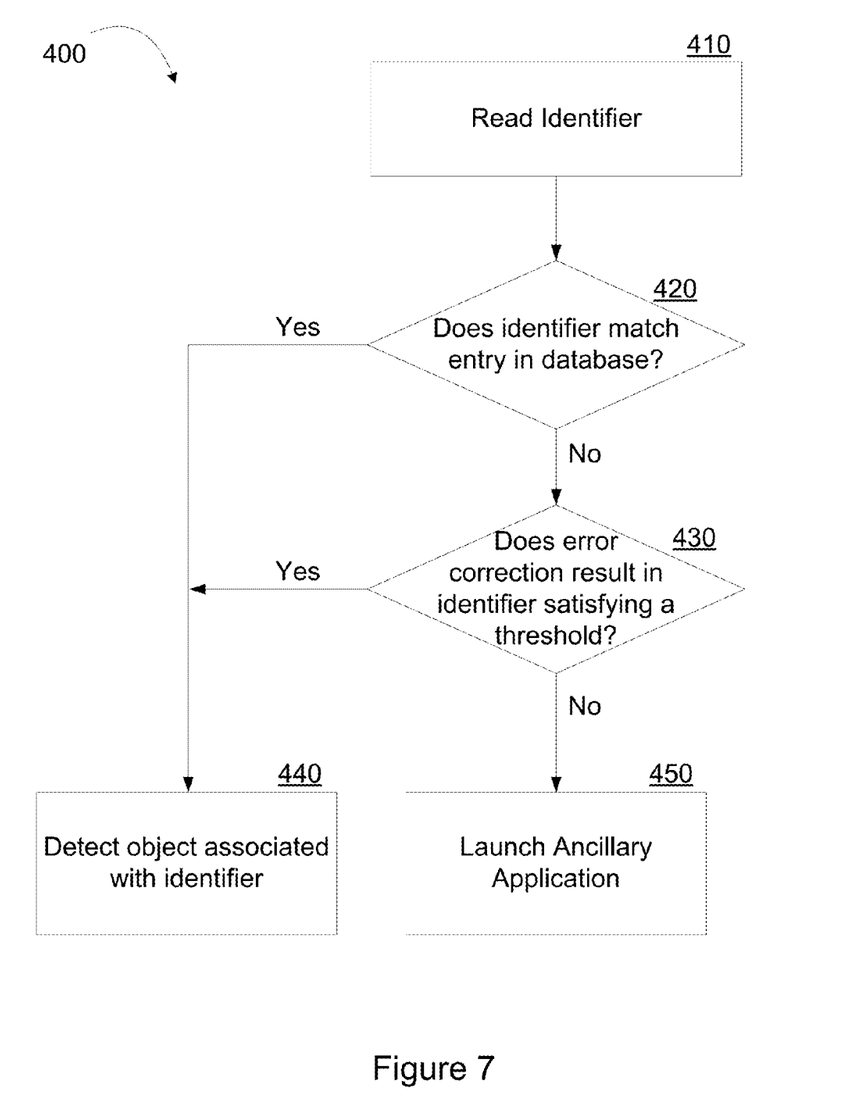
FIG. 7 is a flowchart illustrating an example process for reading of an identifier.

Referring now to FIG. 7, a flowchart illustrates an example process 400 for reading of an identifier by, for example, the example POS device 310 of FIG. 6. The example process 400 begins with the reading of an identifier (block 410). As noted above with reference to FIG. 6, the POS device 310 may be provided with a scanner 312 or other component (e.g., an RFID reader) to read an identifier. In the example of FIG. 6, the scanner 312 may read the POS identifier (e.g., barcode 22) or a non-POS identifier 24, for example.

The POS device 310, or a processor of the POS device 310, may determine whether the identifier read by the POS device 310 matches an entry in a database of identifiers, such as the database of POS identifiers 130 of FIG. 6, for example (block 420). As described above, the POS identifier database 130 may include representations of identifiers associated with POS identifiers for various objects. If the identifier read by the POS device 310 matches an identifier in the POS identifier database 130, the POS device 310 may determine detection of an object associated with the identifier (block 440) and may accordingly process the identifier. In this regard, the processing of the identifier may include, for example, facilitating a sale transaction for the object associated with the identifier.

On the other hand, if the POS device 310 determines that the identifier read does not match any identifier in the database, the POS device 310 may initiate an error correction algorithm. Application of the error correction algorithm may, for example, allow the POS device 310 to identify an identifier in the database even without a direct match, as may occur when a portion of the identifier read by the POS device 310 is missing or otherwise unreadable. In this regard, the error correction may or may not result in the identifier satisfying a threshold, such as the Hamming distance threshold described above. Satisfaction of the threshold may result in the determination of a match between the read identifier and an identifier in the database. If the error correction results in a matching identifier (block 430), the POS device 310 may determine detection of an object associated with the identifier (block 440) and may accordingly process the identifier, as described above.

In various cases, the error correction algorithm may fail to result in a matching identifier in the database. This may occur, for example, if the Hamming distance between the identifier read by the POS device 310 and the identifiers in the database exceeds the extent to which the error correction algorithm is effective. When the POS device 310 determines that the error correction did not result in a match (block 430), the POS device 310 may launch an ancillary application (block 450), which may further process the identifier read by the POS device 310.

In various examples, the ancillary application may provide any of a variety of functions. For example, the ancillary application may be used to detect and/or determine a security breach, such as a forged or falsified identifier. In other examples, the ancillary application may determine an association of the identifier read by the POS device 310 with a different database of identifiers. For example, the ancillary application may determine that the identifier read by the POS device 310 is not a POS identifier, but an identifier associated with an aspect of a workflow associated with the object. Various other types of ancillary application are possible and are contemplated within the scope of the present disclosure.

Various examples described herein are described in the general context of method steps or processes, which may be implemented in one example by a software program product or component, embodied in a machine-readable medium, including executable instructions, such as program code, executed by entities in networked environments. Generally, program modules may include routines, programs, objects, components, data structures, etc. that perform particular tasks or implement particular abstract data types. Executable instructions, associated data structures, and program modules represent examples of program code for executing steps of the methods disclosed herein. The particular sequence of such executable instructions or associated data structures represents examples of corresponding acts for implementing the functions described in such steps or processes.

Software implementations of various examples can be accomplished with standard programming techniques with rule-based logic and other logic to accomplish various database searching steps or processes, correlation steps or processes, comparison steps or processes and decision steps or processes.

The foregoing description of various examples has been presented for purposes of illustration and description. The foregoing description is not intended to be exhaustive or limiting to the examples disclosed, and modifications and variations are possible in light of the above teachings or may be acquired from practice of various examples. The examples discussed herein were chosen and described in order to explain the principles and the nature of various examples of the present invention and its practical application to enable one skilled in the art to utilize the present invention in various examples and with various modifications as are suited to the particular use contemplated. The features of the examples described herein may be combined in all possible combinations of methods, apparatus, modules, systems, and computer program products.

It is also noted herein that while the above describes examples, these descriptions should not be viewed in a limiting sense. Rather, there are several variations and modifications which may be made without departing from the scope as defined in the appended claims.

What is claimed is:

1. An apparatus, comprising:
a processor; and
a memory device including computer program code, the memory device and the computer program code configured to, with the processor, cause the apparatus to perform at least the following:
  select an identifier from a first set of identifiers, the selected identifier having a representation of at least two different characters, the first set of identifiers including candidate identifiers for mass serialization;
  calculate an indication of a difference between the representation of the selected identifier and representations of one or more identifiers from a second set of identifiers; and
  determine that the selected identifier is an eligible identifier for the mass serialization if the indication of the difference satisfies a threshold criteria,
  wherein the indication of the difference is a Hamming distance between the representation of the selected identifier and representations of one or more identifiers from a second set of identifiers, and
  wherein the Hamming distance satisfies the threshold criteria when the Hamming distance is greater than an error correction threshold associated with the second set of identifiers.

2. The apparatus of claim 1, wherein the representation of the selected identifier has a binary representation of 0's and 1's.

3. The apparatus of claim 1, wherein the second set of identifiers includes point-of-sale identifiers.

4. A method, comprising:
selecting a serialization identifier from a first set of serialization identifiers, the selected serialization identifier having a representation of at least two different characters, the first set of identifiers including candidate identifiers for mass serialization;
determining an indication of a difference between the representation of the selected serialization identifier and representations of one or more identifiers from a second set of identifiers; and
if the indication of the difference satisfies a threshold criteria, determining that the selected identifier is an eligible identifier for the mass serialization; and,
if the indication of the difference does not satisfy the threshold criteria, determining that the selected identifier is an ineligible identifier and repeating at least the steps of selecting a serialization identifier from the first set and determining an indication of the difference,
wherein the indication of the difference is a Hamming distance between the representation of the selected serialization identifier and representations of one or more identifiers from a second set of identifiers, and
wherein the Hamming distance satisfies the threshold criteria when the Hamming distance is greater than an error correction threshold associated with the second set of identifiers.

5. The method of claim 4, wherein the representation of the selected identifier is a binary representation of 0's and 1's.

6. The method of claim 4, wherein the second set of identifiers includes point-of-sale identifiers.

7. A computer program product, embodied on a non-transitory computer-readable medium, comprising:
computer code for selecting an identifier from a first set of identifiers, the selected identifier having a representation of at least two different characters, the first set of identifiers including candidate identifiers for mass serialization;

computer code for calculating an indication of a difference between the representation of the selected identifier and representations of one or more identifiers from a second set of identifiers; and computer code for determining that the selected identifier is an eligible identifier for the mass serialization if the indication of the difference satisfies a threshold criteria,
- wherein the indication of the difference is a Hamming distance between the representation of the first identifier and representations of the one or more identifiers from the set of identifiers, and
- wherein the Hamming distance satisfies the threshold criteria when the Hamming distance is less than an error correction threshold associated with the set of identifiers.

8. The computer program product of claim 7, wherein the representation of the selected identifier is a binary representation of 0's and 1's.

9. The computer program product of claim 7, wherein the second set of identifiers includes point-of-sale identifiers.

* * * * *

UNITED STATES PATENT AND TRADEMARK OFFICE
CERTIFICATE OF CORRECTION

| | | |
|---|---|---|
| PATENT NO. | : 8,915,433 B2 | Page 1 of 1 |
| APPLICATION NO. | : 13/785584 | |
| DATED | : December 23, 2014 | |
| INVENTOR(S) | : Steven J Simske et al. | |

It is certified that error appears in the above-identified patent and that said Letters Patent is hereby corrected as shown below:

IN THE CLAIMS:
In column 8, line 61, in Claim 5, delete "0 's and 1 's." and insert -- 0's and 1's. --, therefor.

Signed and Sealed this
Fifth Day of May, 2015

Michelle K. Lee
*Director of the United States Patent and Trademark Office*